United States Patent
Bekaert

(10) Patent No.: US 11,639,131 B2
(45) Date of Patent: May 2, 2023

(54) AWNING ASSEMBLY

(71) Applicant: Dometic Sweden AB, Solna (SE)

(72) Inventor: Miguel Bekaert, Geluwe (BE)

(73) Assignee: Dometic Sweden AB, Solna (SE)

( * ) Notice: Subject to any disclaimer, the term of this patent is extended or adjusted under 35 U.S.C. 154(b) by 844 days.

(21) Appl. No.: 16/422,971

(22) Filed: May 25, 2019

(65) Prior Publication Data

US 2019/0359110 A1 Nov. 28, 2019

(30) Foreign Application Priority Data

May 28, 2018 (DE) .......................... 102018208370.3

(51) Int. Cl.
E04F 10/06 (2006.01)
B60P 3/34 (2006.01)
E04H 15/08 (2006.01)

(52) U.S. Cl.
CPC .......... B60P 3/343 (2013.01); *E04F 10/0614* (2013.01); *E04F 10/0625* (2013.01); *E04H 15/08* (2013.01)

(58) Field of Classification Search
CPC ............. E04F 10/0614; E04F 10/0625; E04F 10/0696; E04F 10/0681; E04F 10/0692; E04F 10/0603; E04H 15/08; B60P 3/343
See application file for complete search history.

(56) References Cited

U.S. PATENT DOCUMENTS 3,720,438 A * 3/1973 Johnson .................. E04H 15/08
135/88.1
4,020,888 A * 5/1977 Upton ..................... B60P 3/343
160/66
4,164,972 A 8/1979 Bennett
4,171,013 A 10/1979 Clark
4,524,791 A 6/1985 Greer (Continued)

FOREIGN PATENT DOCUMENTS

AU 2007214277 10/2013
AU 2013331123 3/2016

(Continued)

OTHER PUBLICATIONS

Brutsaert, EP 0501581 Machine translation, retrieved from https://worldwide.espacenet.com/publicationDetails/biblio?CC=EP&NR=0501581A1&KC=A1&FT=D&ND=3&date=19920902&DB=&locale=en_EP (Year: 1992).*

(Continued)

*Primary Examiner* — Abe Massad
(74) *Attorney, Agent, or Firm* — Dinsmore & Shohl LLP

(57) ABSTRACT

The present embodiments are directed to an awning assembly 1 for a recreational vehicle comprising a main body, a flexible awning material, a roller tube, a lead rail 5, at least one support leg 6 hinged to the lead rail 5, and at least one tension rafter 7 being mountable between the main body and the lead rail 5. The at least one support leg 6 is hinged to the lead rail 5 so that the support leg 6 can be hinged into a first storage section of the lead rail frame 8. The lead rail frame 8 comprises a second storage section 10 for receiving the tension rafter 7 therein, wherein the second storage section 10 comprises an opening 11, wherein either holder 12 is disposed within the opening 11, or the tension rafter 7 is self-clamping into the second storage section 10.

8 Claims, 10 Drawing Sheets

(56) References Cited

U.S. PATENT DOCUMENTS

| | | | |
|---|---|---|---|
| 5,044,416 A | 9/1991 | Murray | |
| 5,094,285 A | 3/1992 | Murray | |
| 5,174,352 A * | 12/1992 | Murray | B60P 3/343 |
| | | | 160/67 |
| 5,207,255 A * | 5/1993 | Shannon | B60P 3/343 |
| | | | 160/46 |
| 5,558,145 A * | 9/1996 | Baka | B60P 3/343 |
| | | | 135/88.12 |
| 5,622,214 A | 4/1997 | Baka | |
| 5,636,675 A * | 6/1997 | Baka | B60P 3/343 |
| | | | 160/67 |
| 5,732,756 A | 3/1998 | Malott | |
| 5,794,679 A * | 8/1998 | Williams | E04F 10/02 |
| | | | 160/46 |
| 5,924,465 A | 7/1999 | Malott | |
| 5,944,085 A | 8/1999 | Malott | |
| 6,006,810 A | 12/1999 | Malott | |
| 6,029,732 A | 2/2000 | Malott | |
| 6,095,221 A | 8/2000 | Frey | |
| 6,131,638 A * | 10/2000 | Levin | E04F 10/02 |
| | | | 160/71 |
| 6,230,783 B1 | 5/2001 | Frey, Jr. | |
| 6,260,908 B1 | 7/2001 | Fraula | |
| 6,276,424 B1 | 8/2001 | Frey, Jr. | |
| 6,279,641 B1 | 8/2001 | Malott | |
| 6,378,591 B1 * | 4/2002 | McCoy | E04F 10/067 |
| | | | 135/88.11 |
| 6,829,861 B1 | 12/2004 | Kobrehel | |
| 6,840,568 B2 | 1/2005 | Carrillo | |
| 6,843,301 B2 | 1/2005 | Carrillo | |
| 6,874,559 B1 | 4/2005 | Hicks | |
| 6,941,700 B1 | 9/2005 | Kobrehel | |
| 7,077,458 B2 | 7/2006 | Malott | |
| 7,281,560 B2 | 10/2007 | Hicks | |
| 7,556,079 B2 | 7/2009 | Hicks | |
| 7,740,044 B2 | 6/2010 | Gutierrez | |
| 8,316,910 B2 | 11/2012 | Popa | |
| 9,057,198 B2 | 6/2015 | Beland | |
| 9,469,996 B2 * | 10/2016 | Ma | E04F 10/04 |
| 9,695,635 B2 | 7/2017 | Taylor | |
| 9,834,952 B1 | 12/2017 | Meyers | |
| 9,889,788 B2 | 2/2018 | Beland | |
| 9,956,900 B2 | 5/2018 | Beland | |
| 10,576,917 B2 | 3/2020 | Taylor | |
| 2013/0098562 A1 | 4/2013 | Gutierrez | |
| 2017/0088068 A1 | 3/2017 | Taylor | |
| 2017/0138056 A1 | 5/2017 | Albertson | |
| 2018/0162260 A1 | 6/2018 | Beland | |
| 2018/0313090 A1 | 11/2018 | Meyers | |
| 2019/0359110 A1 | 11/2019 | Bekaert | |
| 2020/0317145 A1 | 10/2020 | Taylor | |

FOREIGN PATENT DOCUMENTS

| | | |
|---|---|---|
| AU | 2016201189 | 5/2018 |
| AU | 2018201135 | 9/2019 |
| AU | 2019203065 | 12/2019 |
| AU | 2019203640 | 12/2019 |
| CA | 2599185 | 2/2008 |
| CA | 2888620 | 4/2014 |
| CA | 2948854 | 11/2015 |
| CA | 2948856 | 11/2015 |
| CA | 2948063 | 5/2017 |
| CA | 2942465 | 1/2018 |
| CA | 3001819 | 10/2018 |
| CN | 1131447 A | 9/1996 |
| CN | 1856629 A1 | 11/2006 |
| CN | 206049489 U | 3/2017 |
| CN | 107208424 A | 9/2017 |
| CN | 110541600 | 12/2019 |
| DE | 69203483 T2 | 2/1996 |
| DE | 69409768 | 5/1998 |
| DE | 102005040756 | 3/2007 |
| DE | 69935185 | 4/2007 |
| DE | 19802944 B4 | 9/2007 |
| DE | 202007010326 U1 | 9/2007 |
| DE | 202009005040 U1 | 9/2009 |
| DE | 602007009615 | 11/2010 |
| DE | 202011000580 U1 | 6/2011 |
| DE | 19726712 B4 | 10/2012 |
| DE | 102010052285 B4 | 11/2013 |
| DE | 102017208921 | 6/2018 |
| DE | 102017208921 B3 | 6/2018 |
| DE | 102018208370 | 11/2018 |
| DE | 102018208370 A1 | 11/2018 |
| DE | 102017215282 | 2/2019 |
| DE | 102018208374 | 5/2019 |
| DE | 102018208374 B3 | 5/2019 |
| EP | 036677 B1 | 5/1992 |
| EP | 0501581 A1 | 9/1992 |
| EP | 657323 | 6/1995 |
| EP | 0686742 A1 | 12/1995 |
| EP | 980787 | 2/2000 |
| EP | 1396592 | 3/2004 |
| EP | 1439091 | 7/2004 |
| EP | 1627976 | 2/2006 |
| EP | 1767722 A2 | 3/2007 |
| EP | 1895070 | 3/2008 |
| EP | 1895071 | 3/2008 |
| EP | 3145739 | 3/2017 |
| EP | 3145740 | 3/2017 |
| JP | 2007062720 | 3/2007 |
| WO | 2014063038 | 4/2014 |
| WO | 2015175990 | 11/2015 |
| WO | 2015176013 | 11/2015 |

OTHER PUBLICATIONS

Examination Report mailed in DE Patent Application No. 102017208923.7 dated Feb. 9, 2018.
Decision to Grant mailed in DE Patent Application No. 102018208374.6 dated Feb. 13, 2019.
Decision to Grant mailed in DE Patent Application No. 102017208921.0 dated Mar. 5, 2018.
AU Patent Application No. 2019203065 filed on Apr. 30, 2019.
AU Patent Application No. 2019203640 filed on May 24, 2019.
CN Patent Application No. 201910449263.3 filed on May 28, 2019.
DE Patent Application No. 102017208923.7 filed on May 26, 2017.
Examination Report mailed in DE Patent Application No. 102018208370.3 dated Dec. 5, 2019.
Decision to Grant mailed in DE Patent Application No. 102018208370.3 dated Mar. 3, 2021.
Office Action Issued in China Patent Application No. 201910449263.3 dated Oct. 11, 2021.
DE Application No. 102018208370.3 filed May 28, 2018 titled Awning Assembly.
Australian Application No. 2016222517 filed Sep. 5, 2016 titled Awning Assembly.
Dometic Product Catalog—Awnings, 2015.
Dometic Product Catalog—Awnings, 2016.
Office Action Issued in China Patent Application No. 201910449263.3 dated Apr. 19, 2022.

\* cited by examiner

AWNING ASSEMBLY

This non-provisional patent application claims priority to and benefit of, under 35 U.S.C. § 119(a), German application number 10 2018 08370.3, filed May 28, 2018, titled, "Awning Assembly", all of which is incorporated by reference herein.

The present embodiments relate to an awning assembly for a vehicle, especially for a recreation vehicle, e.g. a camper, a caravan or a mobile home. The awning assemblies may be used to shelter an area next to the recreational vehicle from direct sunlight or from rain.

In general, such awning assemblies comprise a main body which is fixable to a support structure of the recreational vehicle, e.g. a side wall. A roller tube is rotatably supported at the back cover so that a flexible awning material can be selectively rolled onto or from the roller tube. To achieve this effect, a lead rail is provided which is connected to a first end of the flexible awning material, wherein the second end of the flexible awning material is connected to the roller tube. Thus, by moving the lead rail away from the main body the flexible awning material is rolled off from the roller tube.

For supporting the lead rail, such awning assemblies generally comprise at least one tension rafter and at least one support leg. In general, the tension rafter is mountable between the main body and the lead rail when the flexible awning material is rolled off from the roller tube. In addition, the at least one support leg is also attached to the lead rail in a substantially perpendicular direction to support the lead rail on the ground surface when the awning assembly is in an operating state. To facilitate the handling, the lead rail often comprises lead rail frame, wherein the support leg is hinged to the lead rail so that the support leg can be hingewise moved into a first storage section of the lead rail frame in which the longitudinal axis of the support leg is substantially parallel to the longitudinal axis of the lead rail. Thus, when assembling and disassembling the awning assembly, there is no need to remove the at least one support leg from the lead rail, which facilitates the handling of the awning assembly.

The tension rafter can have different forms and may e.g. be provided in form of arm assemblies having two parts being hinged together. Such an arrangement is shown in EP 1 767 722 A2. However, such complex arm assemblies distinctly increase the dimensions of the awning assembly and the costs thereof.

Thus, there are also solutions known comprising a tension rafter which is simply manually mounted between the lead rail and main body. To account for different distances between the main body and the lead rail and also to have a certain tension between the main body and the lead rail, the tension rafters are mostly telescopic tension rafters. The tension rafters are easy to handle and are generally stored within the recreational vehicle when the awning assembly is not in use.

However, this bears the risk that the tension rafter gets lost or is forgotten somewhere, so that the awning assembly may not be used correctly when the recreational vehicle is parked. In addition, the available space within the recreational vehicle is often limited so that it is generally desirable to reduce the number of items which are to be stored or secured within the recreation vehicle.

In view of this, an object of the present embodiments is to provide an awning assembly which allows for a secure storage of the tension rafter when not in use.

The present embodiments provide an awning assembly for a vehicle, especially a recreational vehicle, comprising a main body, a flexible awning material, a roller tube, a lead rail, at least one support leg hinged to the lead rail, and at least one tension rafter being mountable between the main body and the lead rail.

The roller tube is rotatably supported at the main body, and a first end of the flexible awning material is attached to the roller tube and a second end of the flexible awning material is attached to the lead rail so that moving the lead rail relative to the main body selectively rolls the flexible awning material onto or from the roller tube.

According to some embodiments, the lead rail comprises a lead rail frame, wherein the at least one support leg is hinged to the lead rail so that the support leg can be hingewise moved into a first storage section of the lead rail frame in which the longitudinal axis of the support leg is substantially parallel to the longitudinal axis of the lead rail.

According to some embodiments, the lead rail frame comprises a second storage section for receiving the tension rafter therein, while the second storage section comprises an opening, wherein either a holding means is disposed within the opening, or the tension rafter is self-clamping into the second storage section.

Thus, not only the support leg is stored in a specific storage section of the lead guide rail, but also the tension rafter is manually stored in the second storage section, which is included in the lead rail frame and, hence, not within the recreational vehicle. As such, the tension rafter shall not be stored within e.g. the recreational vehicle when the awning assembly is not in use. This greatly reduces the risk of the tension rafter to get lost and thus to corrupt the correct functionality of the awning assembly. In addition, this also facilitates room use within the recreational vehicle.

In some embodiments, the second storage section is an integral member of the lead rail frame. This allows for a compact design. In addition, manufacturing is greatly facilitated as the entire lead rail frame including the second storage section can be provided e.g. by continuous profile casting. In particular, the lead rail frame can be made of an aluminum alloy or a plastic material.

In some embodiments, the second storage section comprises an opening, wherein a holding means is disposed within the opening, the holding means being configured to receive at least a part the tension by form-lock fixing. Thus, the tension rafter can be introduced into the second storage section via the opening and is securely held therein in being form-locked fixed to the holding means. Hence, the tension rafter cannot unintentionally be lost. Further, due to the form-lock fixing rattling noises or the like which may occur due to vibrations during movement of the recreational vehicle are also greatly reduced.

In some embodiments, the holding means is at least partially composed of a flexible material. Thus, the holding means can firstly be manually bent, then the tension rafter is introduced and finally the holding means is unhanded so that it returns to its original shape and locks the tension rafter by form-fixing within the second storage section.

In this connection, it may be desirable that the holding means comprises a bracket, wherein the bracket is elastically movable between a holding position and a releasing position, so that the tension rafter can be inserted or removed from the second storage section when the bracket is in the releasing position. This allows for a very convenient handling.

In some embodiments, the holding means comprises a hooking projection and the lead rail frame comprises an abutment protrusion, wherein the hooking projection hooks into the abutment protrusion. As such, the holding means can be secured to the lead rail frame without the need for a further attachment means, e.g. a screw or the like. In addition, this allows for a fast replacement of the holding means in case the holding means is defect. The abutment protrusion may be integrally formed with the lead rail frame.

The holding means may be composed of a bent spring wire. The holding means can thus be manufactured in a cost-efficient way. In addition, the hooking protrusion can also be easily manufactured.

In some embodiments, regarding the self-clamping alternative of the tension rafter, the tension rafter has an elongated form and is capable of clamping itself into the second storage section in a force-locking manner by exerting a force in the longitudinal direction of the tension rafter. Thereby, no extra holding means are necessary at the second storage section and the embodiment provide for a very smooth and easy handling.

The force may be exerted by a spring comprised by the tension rafter, which pushes an abutment element of the tension rafter in the longitudinal direction of the tension rafter and the abutment element abuts against an end portion of the second storage section, when the tension rafter is stored therein. This is one illustrative way to create the force-locking.

The tension rafter may comprise the spring and the abutment element at each of its axial ends. This even increases the flexibility of the handling and, if once one of the mechanisms will not work anymore, the clamping still works because of the second one.

At least one end portion of the second storage section is represented by a tension rafter holder, designed as a counterpart to the abutment element which is variable in its position so that the length of the second storage section can be varied. This counterpart can also be defined as a tension rafter holder. An advantage of this embodiment is that, once the springs decrease in strength, the space provided by the second storage section can be downsized in order to get more force on the force-locking clamping again. Furthermore, various tension rafters different in length can be stored.

The tension rafter holder additionally provides for clamping the tension rafter into the second storage section in a form-locking manner. The form-locking provides further stability of the stored tension rafter in addition to the force-locking manner of the self-clamping.

The lead rail frame may comprise a first receiving portion and the main body comprises a second receiving portion, wherein the first and second receiving portions are configured to each receive an axial end of the tension rafter. When the awning assembly is in use, the tension rafter can thus easily be installed to the main body and to the lead rail frame so that tension is exerted on the flexible awning material.

The lead rail may comprise a carriage being mounted to the lead rail frame so as to be slidably movable along the longitudinal axis of the lead rail, wherein the at least one support leg is hingewise mounted to the carriage. Thus, the position of the support leg can be adjusted in its lateral position relative to the lead rail.

The carriage is slidably movable between a first position in the area of the first axial end of the lead rail frame and a second position in the area between the middle of the lead rail frame and the second axial end of the lead rail frame, wherein the at least one support leg is movable into the first storage section for every position of the carriage between the first position and the second position. Hence, this greatly reduces the lateral space requirements for moving the support leg from or to the first support portion. That is because the carriage can e.g. be slid into about the middle of the lead rail frame before the support leg is tilted into the first support portion. In addition, the awning assembly can thus be operated much easier, as the support leg can be moved along the lead rail frame even when being in the operating state, i.e. substantially perpendicular to the longitudinal axis of the lead rail.

Next, the invention will be further described with reference to a specific embodiment shown in the drawings, wherein schematically FIG. 1 is a cross sectional side view of an inventive awning assembly;

Figure 1:
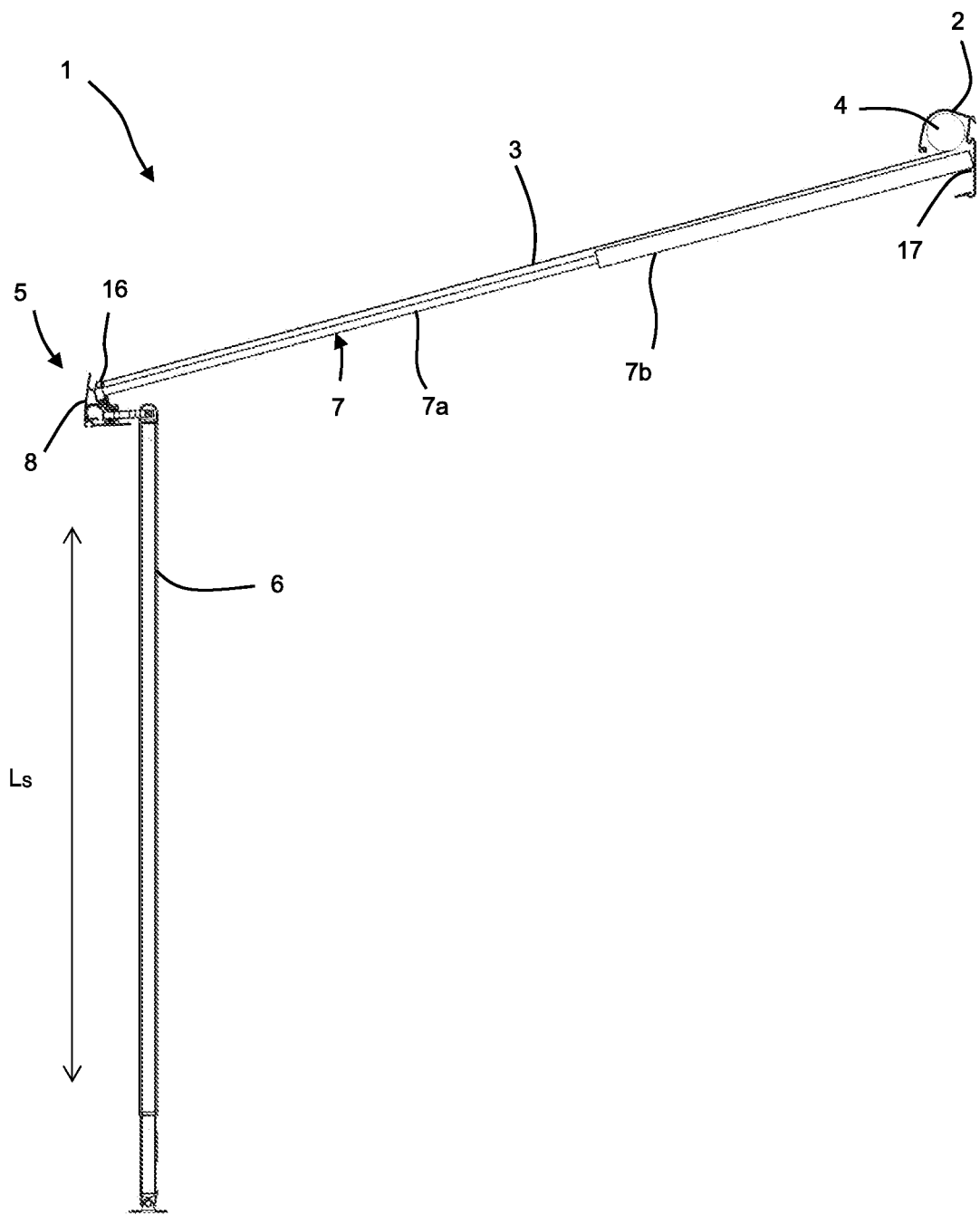
Figure 2:
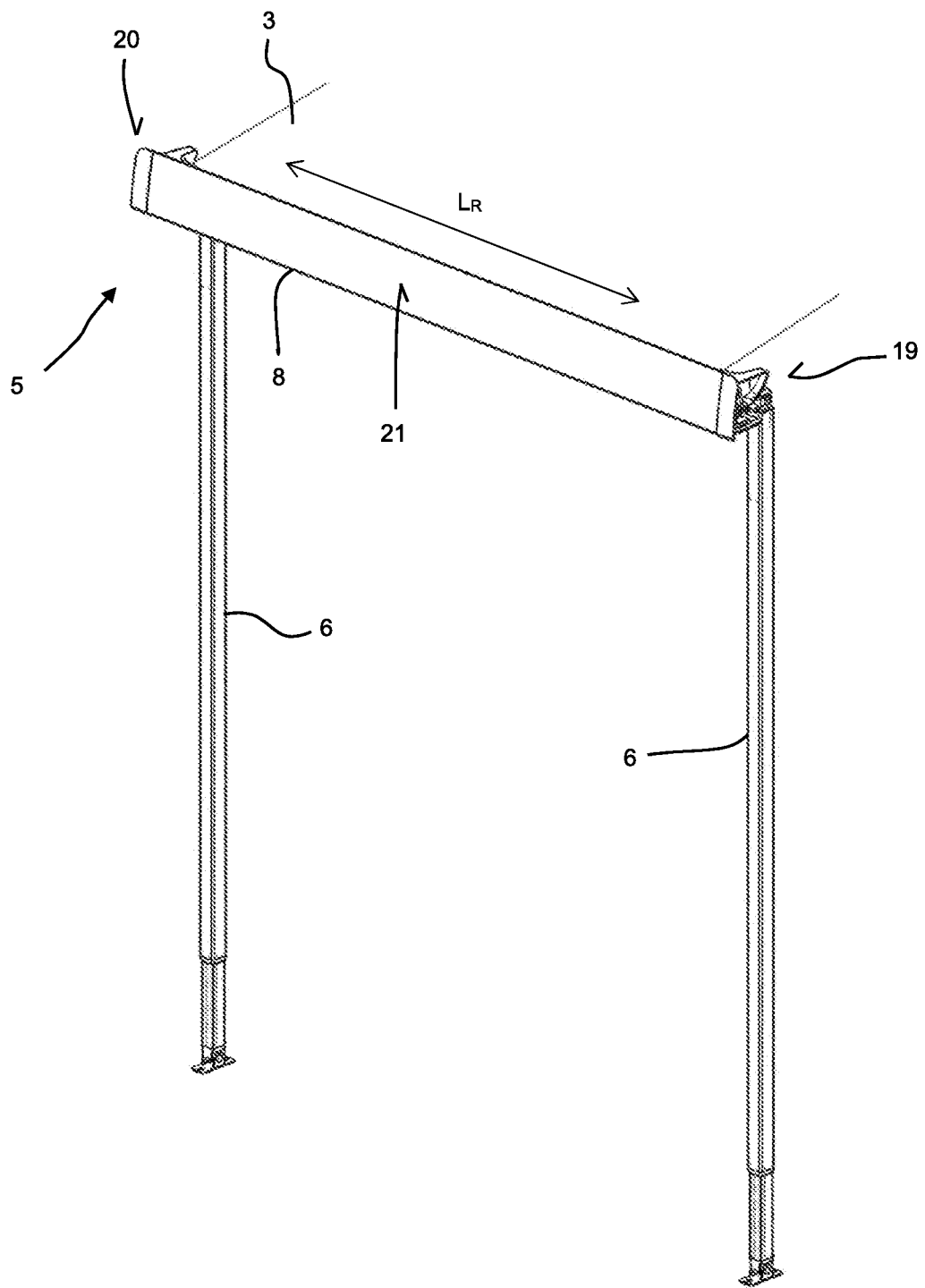
FIG. 2 is a perspective view of a front part of an inventive awning assembly.

In FIG. 1 and FIG. 2 there is shown an inventive awning assembly 1 in the operational state. The awning assembly 1 comprises a main body 2 attached to a (not shown) support structure of a (not shown) recreational vehicle in a known manner. The main body 2 comprises a roller tube 4 which is rotatably supported at the main body 2. The awning assembly 1 further comprises a lead rail 5 and a flexible awning material 3. A first end of the flexible awning material 3 is attached to the roller tube 4 and a second end of the flexible awning material 3 is attached to the lead rail 5. Moving the lead rail 5 relative to the main body 2 thus rolls the flexible awning material 3 onto the roller tube 4 or from the roller tube 4 in a known manner.

The lead rail 5 comprises a lead rail frame 8 and two support legs 6 which are hingewise mounted to the lead rail frame 8 via a carriage 18. The support legs 6 can be pivoted relative to the carriage 18 so that they are moved to or from a first storage section 9 of the lead rail frame 8, as will be explained in further detail below in reference to FIGS. 6 and 7.

The awning assembly 1 further comprises a tension rafter 7. As shown in FIG. 1, the tension rafter 7 is an elongated tubular member which comprises of two parts 7a, 7b which are telescopically mounted to each other. Thus, the tension rafter 7 can be adjusted in its axial extension in that the first part 7a is slidably extended from the second part 7b and the fixed against further movement in known manner, e.g. by rotating the first part 7a relative to the second part 7b. As can be further seen from FIG. 1, the axial end of the first part 7a of the tension rafter 7 is mounted to a first receiving section 16 of the lead rail frame 8, wherein the axial end of the second part 7b of the tension rafter 7 is mounted to the a second receiving section 17 of the main body 2. Thus, the tension rafter 7 exerts tension onto the flexible awning material 3 and further supports the lead rail 5 in its position in combination with the support legs 6.

When the awning assembly 1 is in the non-usage state, the support legs 6 are located in the first storage section 9 (cf. e.g. FIG. 6) and the flexible awning material 3 is nearly completely rolled onto the roller tube 4. The tension rafter 7 is also demounted from the first and second receiving sections 16, 17 and the first part 7a is about completely disposed within the second part 7b. For storing the tension rafter 7, the lead rail frame 8 comprises a second storage section 10, which is integrally formed with the lead rail frame 8. In particular, the lead rail frame 8 of the present invention is made from continuous profile casting of e.g. an aluminum alloy.

Figure 3:
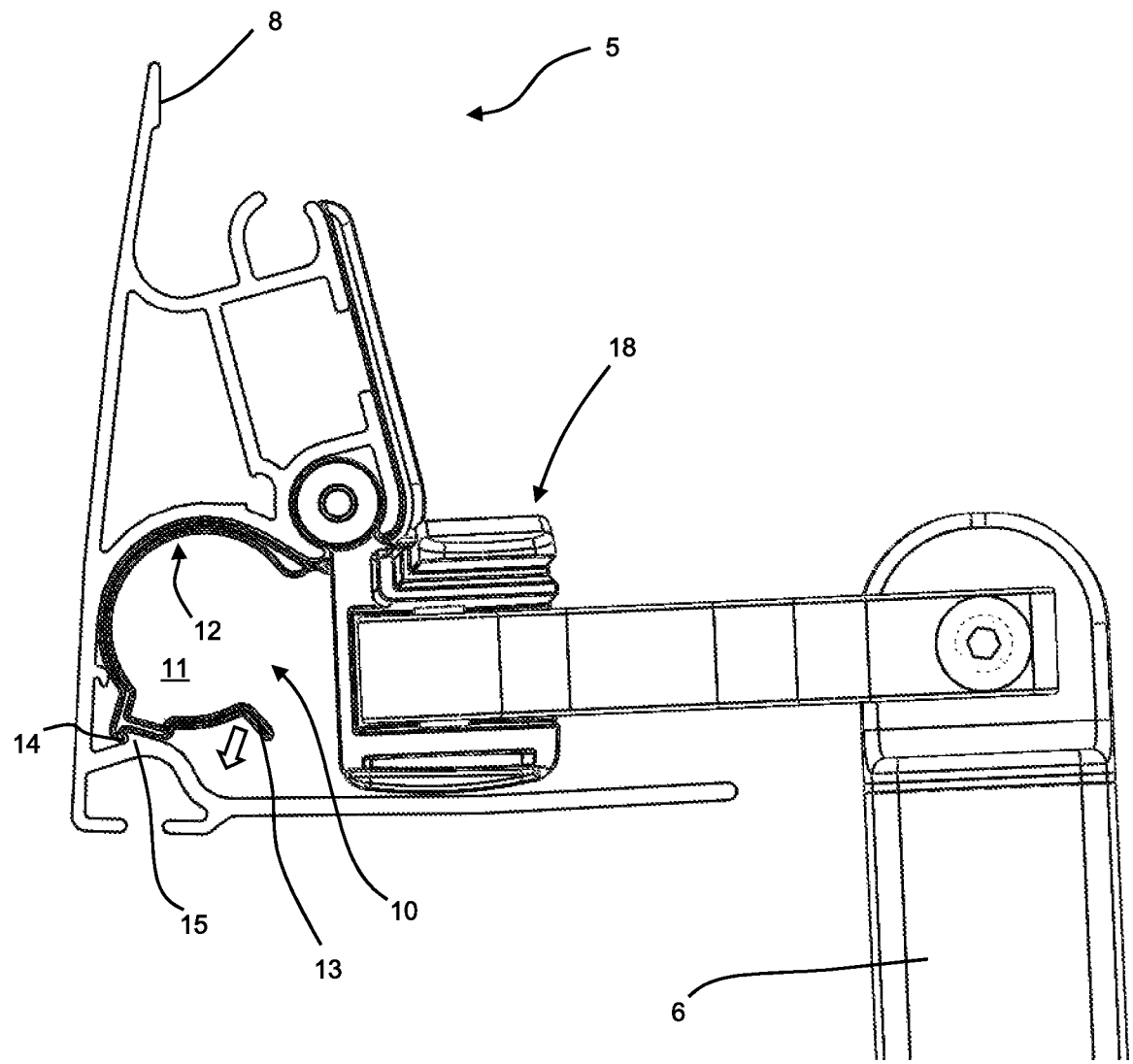
FIG. 3 is a first cross sectional view through the lead rail.
Figure 4:
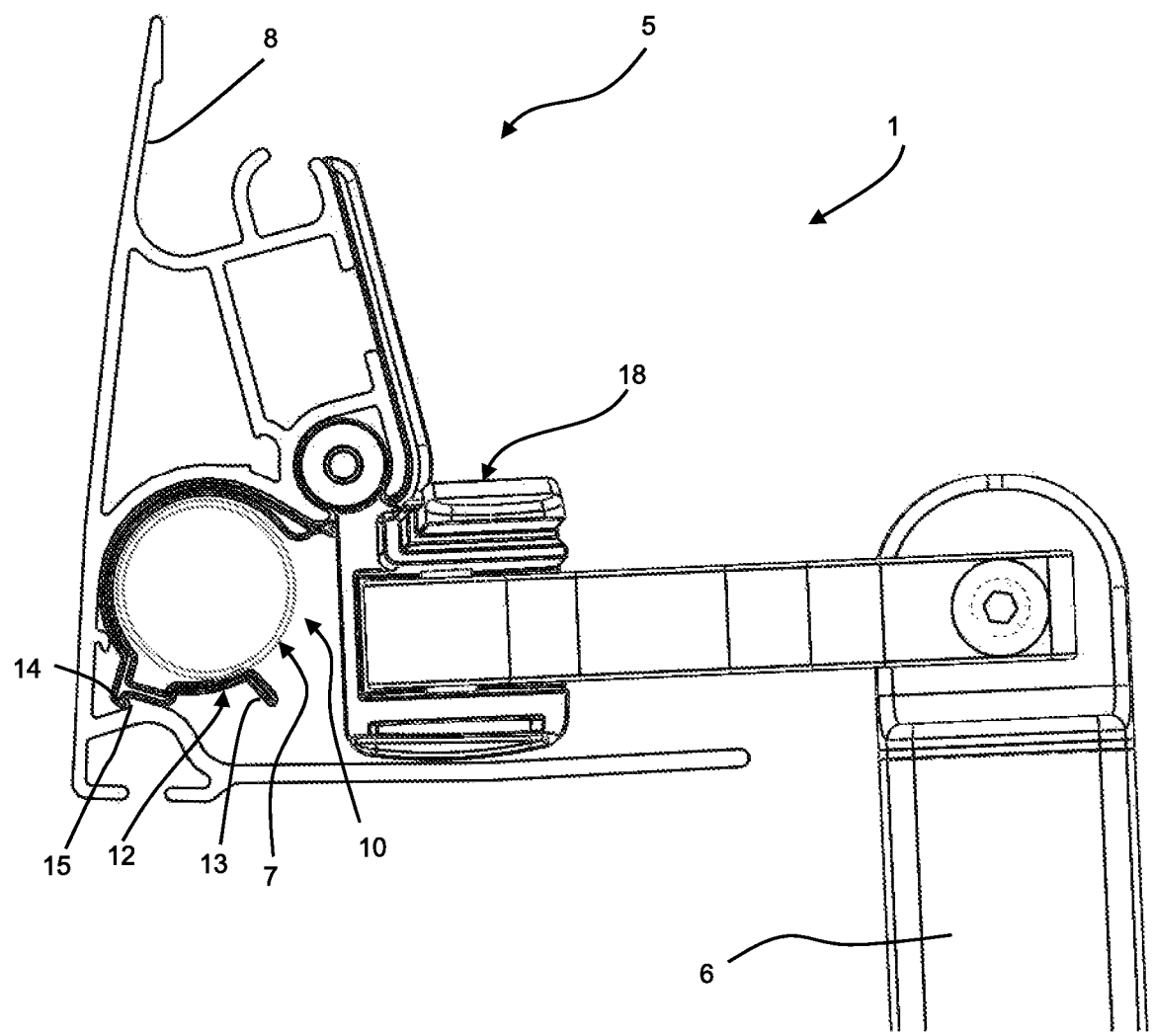
FIG. 4 is a second cross section view through the lead rail.
Figure 5:
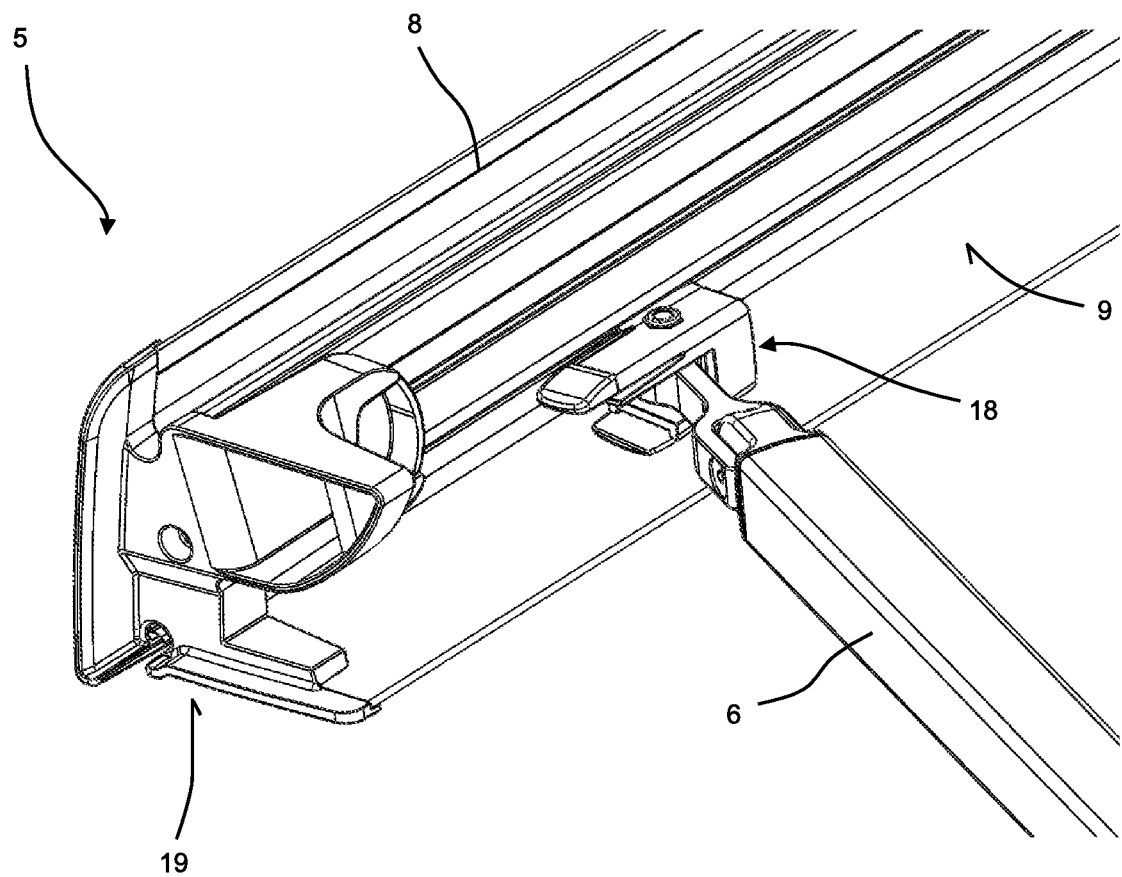
FIG. 5 is a first perspective view of a part of the lead rail.

As shown in FIGS. 3 and 4, the second storage section 10 comprises an opening 11 for introducing the tension rafter 7 into the second storage section 10. In addition, there is provided a holder or holding means 12 which is disposed within the opening 11 or in the area of the opening 11. The holding means 12 is composed of a bent spring wire and comprises a bracket 13 which can be manually moved between a holding position (as shown in FIG. 3) to a releasing position, the latter one being indicated by the bold arrow in FIG. 3. As the bracket 13 is also of flexible material, it returns into its original holding position when let loose. As a matter of course, the holder or holding means 12 can be composed of any suitable material having flexibility to hold the tension rafter 7.

In addition, the holding means 12 comprises a hooking projection 14 which hooks into an abutment projection 15 of the lead rail frame 8. As shown in FIG. 3 and FIG. 4 the abutment projection 15 is integrally formed with the lead rail frame 8 and extends into the second storage section 10. When the hooking projection 14 is hocked into the abutment projection 15, the holding means 12 is hindered from moving rotationally within the second storage section 10 when the bracket 13 is moved manually into the releasing position.

For introducing the tension rafter 7 into the second storage position 10 the bracket 13 is manually moved into the releasing position and the tension rafter 7 is inserted through the opening 11 into the second storage section 10. When the tension rafter 7 is completely disposed within the second storage section 10 the bracket 13 is unhanded and thus returns into the holding position. In said holding position the tension rafter 7 is form-locked fixed in the second storage section 10, as shown in FIG. 4.

To remove the tension rafter 7 again, the bracket 13 is manually moved into the releasing position and the form-lock fixing between the tension rafter 7 and the holding means 12 is suspended. Then, the tension rafter 7 can be removed from the second storage section 10 via the opening 11. After the tension rafter 7 is removed, the bracket 13 is again unhanded and it returns into its original holding position.

As shown in FIG. 2, the awning assembly comprises two support legs 6 each being mounted to the lead rail frame 8 via a carriage 18. The carriage 18 is slidably mounted to the lead rail frame 8 so as so be slidably movable along the longitudinal axis $L_R$ of the lead rail 5. In particular, each of the carriages 18 is movable between an axial end 19, 20 of the lead rail frame 8 and about the middle 21 of the lead rail frame 8.

As such, the carriage 18 the right support leg 6 shown in FIG. 2 is attached to is movable between a first position in the area of first axial end 19 of the lead rail frame 8 and a second position in the area between the second axial end 20 of the lead rail frame 8 and about the middle 21 of the lead rail frame 8. Hence, the carriage 18 of the left support leg 6 shown in FIG. 2 is attached to is movable between a first position in the area of second axial end 20 of the lead rail frame 8 and a second position in the area between the first axial end 19 of the lead rail frame 8 and about the middle 21 of the lead rail frame 8.

Figure 6:
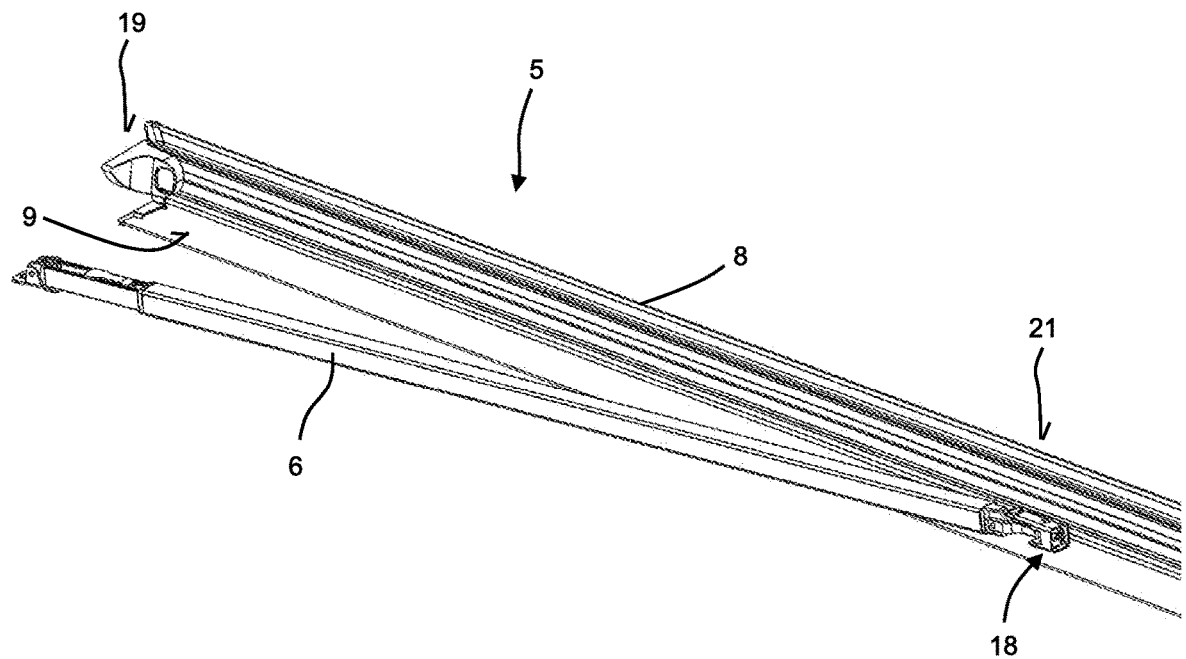
FIG. 6 is a second perspective view of a part of the lead rail.
Figure 7:
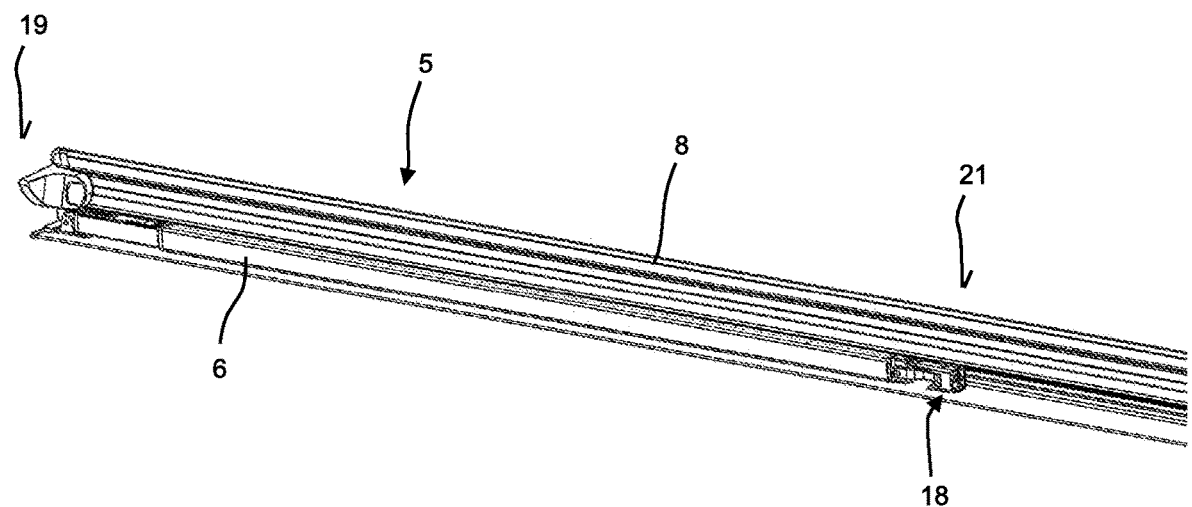
FIG. 7 is a third perspective view of a part of the lead rail.

As shown in FIG. 6 and FIG. 7 for moving the support leg 6 into the first storage section 9, the carriage 18 is slidably moved from the first position in the area of the first axial end 19 of the lead rail frame 8 into the second position which is about in the middle 21 of the lead rail frame 8. As the support leg 6 is hingewise mounted to the carriage, it can thus be pivoted or tilted so that the longitudinal axis $L_S$ of the support leg 6 is substantially parallel to the longitudinal axis $L_R$ of the lead rail 5. When assembling the awning assembly 1 into the operating state, the support leg 6 is first pivoted from the first storage position 9 into an operating position, i.e. a position where the support leg 6 is substantially perpendicular to the lead rail 5. Second, the carriage 18 is slidably moved from the second position in the area of the middle 21 of the lead rail frame 8 to the first position in the area of the first axial end 19 of the lead rail frame. An identical course of action is carried out for the other support leg 6. This also allows for facilitated handling, as the support legs 6 do not need to be tilted from a fixed position in the area of the axial ends 19, 20 of the lead rail 5.

Figure 8:
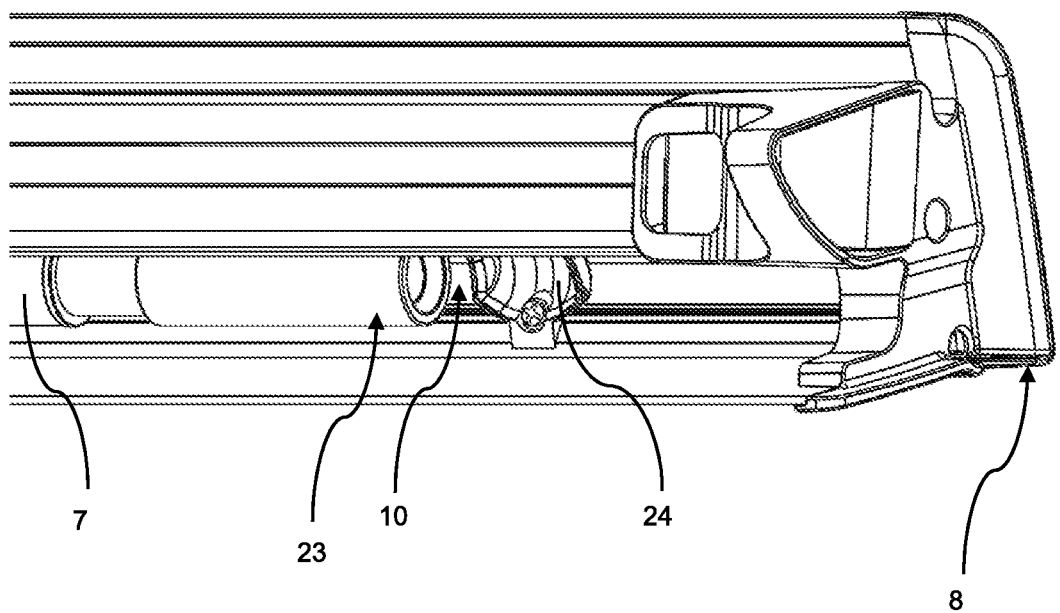
FIG. 8 is another perspective view from behind the lead rail.
Figure 9:
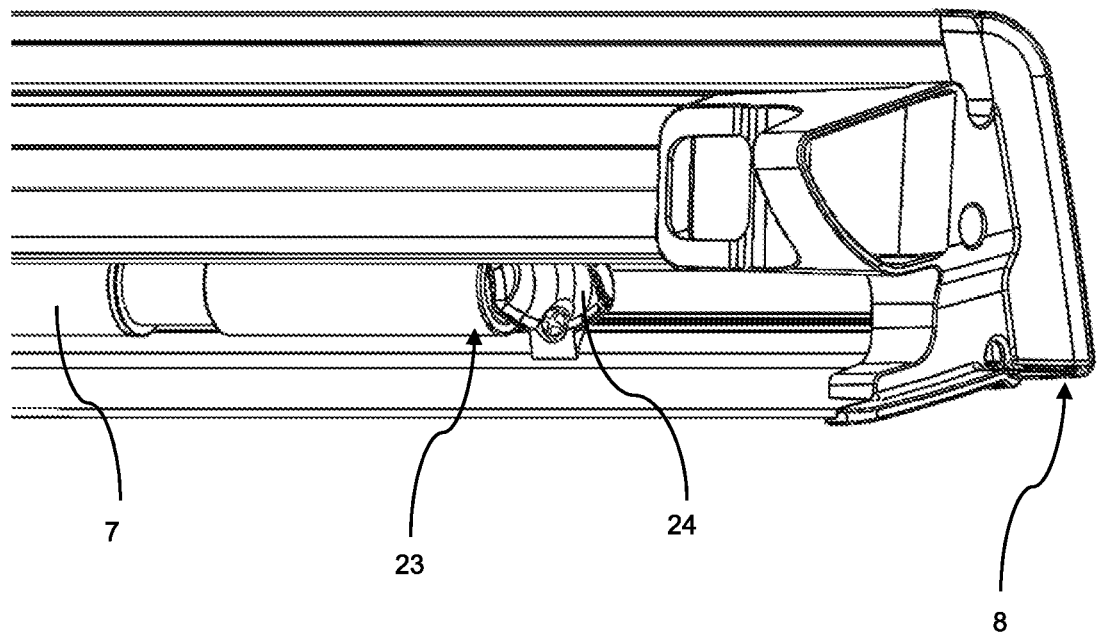
FIG. 9 is another perspective view from behind the lead rail.

In FIG. 8 the self-clamping alternative is illustrated with an exemplary embodiment. As can be seen, the tension rafter 7 is already placed within the space of the second storage section 10. In the shown situation, the abutment element 23 is still pushed away from the tension rafter holder 24 being designed as the counterpart to the abutment element 23. Now, when the abutment element is loosened somehow, it will be pushed by the spring inside the tension rafter 7 in the direction of the tension rafter holder 24 the result of which can be seen in FIG. 9. As shown therein, the tension rafter 7 is self-clamped into the second storage section 10 in a force-locking and form-locking manner. The holder 24 is formed such that it fits to the form of the abutment element 23, thereby forming the counterpart of the abutment element 23 at the contact portion of the two components. In order to take the tension rafter 7 out again, the abutment element 23 simply must be pushed back to disengage with the holder 24 again.

Figure 10:
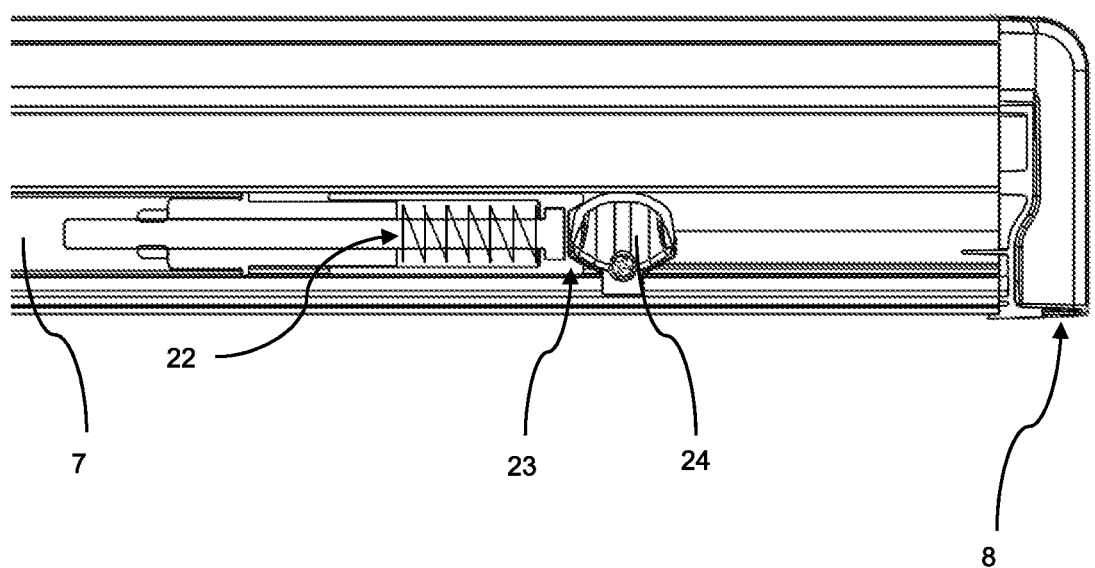
FIG. 10 is a view from behind the lead rail and an in-part cross-section of the tension rafter.
Figure 11:
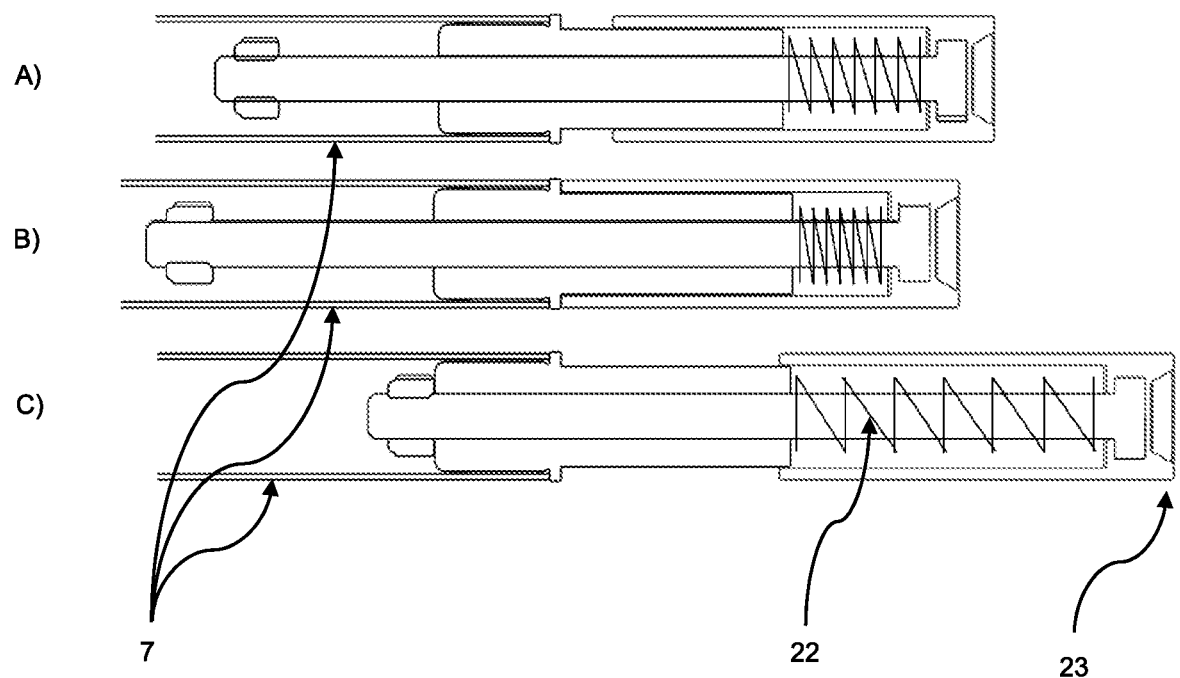
FIG. 11 shows three cross-sections of the tension rafter in three different situations.

As can be seen in FIG. 10, the force with which the abutment element 23 is pressed against the tension rafter holder 24 can be exerted by a spring 22 according to one embodiment of the invention. In some embodiments, the spring 22 is a coil spring which is wound around a piston having the abutment element 23 at its end corresponding to the axial end of the tension rafter 7. This embodiment of the tension rafter 7 is shown in the cross-sectional view of FIG. 11 in which three situations A, B and C are shown. As can be easily grasped from FIG. 11, Situation A represents a middle position of the abutment element 23, while situations B and C represent the two end positions, B the retracted and C the extended position.

LIST OF REFERENCE SIGNS 1 awning assembly
2 main body
3 flexible awning material
4 roller tube
5 lead rail
6 support leg
7 tension rafter
7a first part of tension rafter
7b second part of tension rafter
8 lead rail frame 9 first storage section
10 second storage section
11 opening
12 holding means
13 bracket
14 hooking projection
15 abutment protrusion
16 first receiving portion
17 second receiving portion
18 carriage
19 first axial end of lead rail frame
20 second axial end of lead rail frame
21 middle of lead rail frame
22 spring
23 abutment element
24 tension rafter holder
A middle position of self-clamping tension rafter
B retracted position of self-clamping tension rafter
C extended position of self-clamping tension rafter
$L_S$ longitudinal axis of support leg
$L_R$ longitudinal axis of lead rail

The invention claimed is:

1. An awning assembly for a recreational vehicle, comprising:
a main body, a flexible awning material, a roller tube, a lead rail, at least one support leg hinged to the lead rail, and at least one tension rafter being mountable between the main body and the lead rail, wherein the roller tube is rotatably supported at the main body, and a first end of the flexible awning material is attached to the roller tube and a second end of the flexible awning material is attached to the lead rail so that moving the lead rail relative to the main body selectively rolls the flexible awning material onto or from the roller tube, wherein the lead rail comprises a lead rail frame, wherein the at least one support leg has a first hinged connection to a carriage and the carriage has a second hinged connection to the lead rail so that the at least one support leg can be hingewise moved into a rearward first storage section of the lead rail frame in which a longitudinal axis of the at least one support leg is substantially parallel to a longitudinal axis of the lead rail, said first hinged connection having a first pivot axis and said second hinged connection having a second pivot axis perpendicular to said first pivot axis;
wherein said carriage is slidably positionable in said rearward first storage section, and said at least one support leg is configured to be stored in said rearward first storage section;
wherein the lead rail frame comprises a forward second storage section configured to store the at least one tension rafter therein, said forward second storage section positioned closer to a leading edge of the lead rail than the rearward second storage, such that the forward second storage section is positioned further from said roller tube than said rearward first storage section when the awning assembly is in an extended position; and
wherein the carriage is slidably movable along the longitudinal axis of the lead rail between a first position adjacent to a first axial end of the lead rail frame and a second position in an area between a middle of the lead rail frame and a second axial end of the lead rail frame, wherein the at least one support leg is movable into the first storage section when the carriage is in the second position, such that a bottom of the at least one support leg is positioned adjacent to the first axial end of the lead rail frame when the at least one support leg is stored in said rearward first storage section.

2. The awning assembly according to claim 1, wherein the forward second storage section is an integral member of the lead rail frame.

3. The awning assembly according to claim 1, wherein the at least one tension rafter has an elongated form and is capable of clamping itself into the forward second storage section in a force-locking manner by exerting a force in a longitudinal direction of the at least one tension rafter.

4. The awning assembly according to claim 3, wherein the force is exerted by a spring comprised by the at least one tension rafter, which pushes an abutment element of the at least one tension rafter in the longitudinal direction of the at least one tension rafter and the abutment element abuts against an end portion of the forward second storage section when the at least one tension rafter is stored therein.

5. The awning assembly according to claim 4, wherein each tension rafter of the at least one tension rafter comprises the spring and the abutment element at each axial end.

6. The awning assembly according to claim 4, wherein at least one end portion of the forward second storage section comprises a tension rafter holder, which is a counterpart to the abutment element which is variable in position so that a length of the forward second storage section can be varied.

7. The awning assembly according to claim 6, wherein the tension rafter holder additionally provides for clamping the at least one tension rafter into the forward second storage section in a form-locking manner.

8. The awning assembly according to claim 1, wherein the lead rail frame comprises a first receiving portion and the main body comprises a second receiving portion, wherein the first and second receiving portions are configured to each receive an axial end of the at least one tension rafter.

* * * * *

UNITED STATES PATENT AND TRADEMARK OFFICE
CERTIFICATE OF CORRECTION

PATENT NO. : 11,639,131 B2  
APPLICATION NO. : 16/422971  
DATED : May 2, 2023  
INVENTOR(S) : Miguel Bekaert Page 1 of 1

It is certified that error appears in the above-identified patent and that said Letters Patent is hereby corrected as shown below:

In the Specification

Column 1, Lines 3-7:
"This non-provisional patent application claims priority to and benefit of, under 35 U.S.C. §119(a), German application number 10 2018 08370.3, filed May 28, 2018, titled, "Awning Assembly", all of which is incorporated by reference herein."
Should be corrected to read:
--This non-provisional patent application claims priority to and benefit of, under 35 U.S.C. §119(a), German application number 10 2018 208370.3, filed May 28, 2018, titled, "Awning Assembly", all of which is incorporated by reference herein.--

Signed and Sealed this  
Sixteenth Day of April, 2024

Katherine Kelly Vidal  
*Director of the United States Patent and Trademark Office*